Jan. 16, 1940.   R. L. SCHUHMANN   2,187,102
GRINDING MILL
Filed Oct. 31, 1936   2 Sheets-Sheet 1
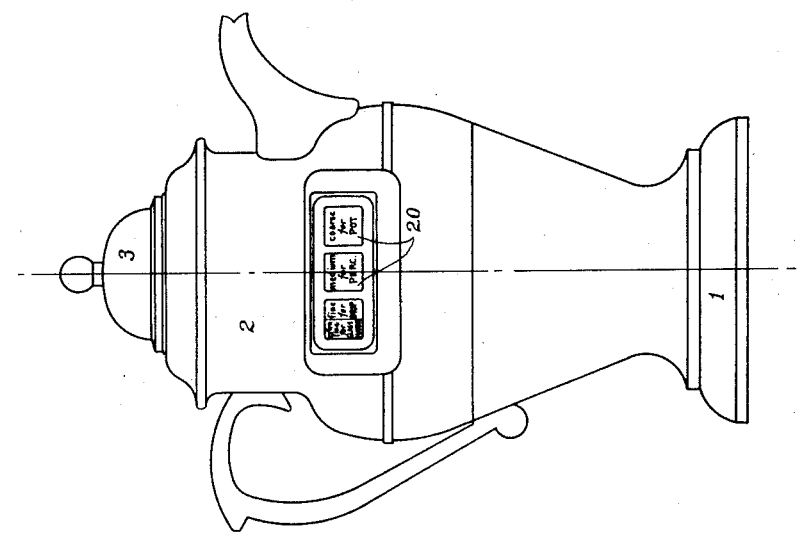
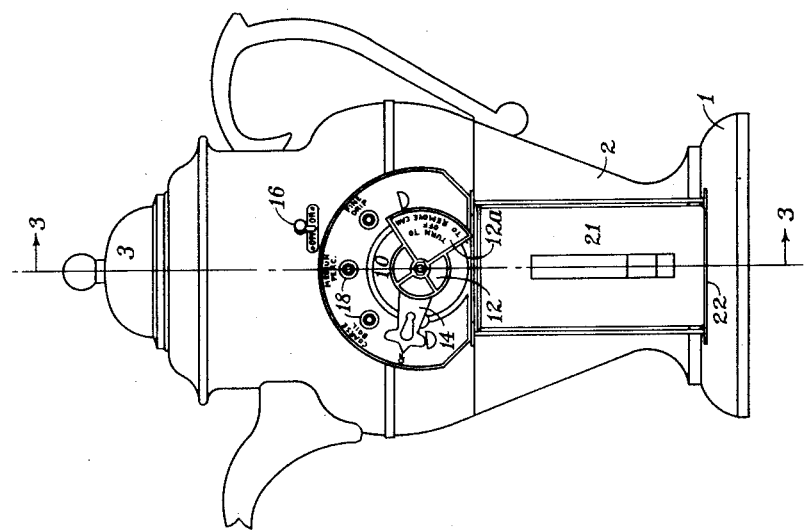
INVENTOR.
Richard L. Schuhmann
BY *Arthur H Robert*
ATTORNEYS.

Jan. 16, 1940. R. L. SCHUHMANN 2,187,102
GRINDING MILL
Filed Oct. 31, 1936 2 Sheets-Sheet 2
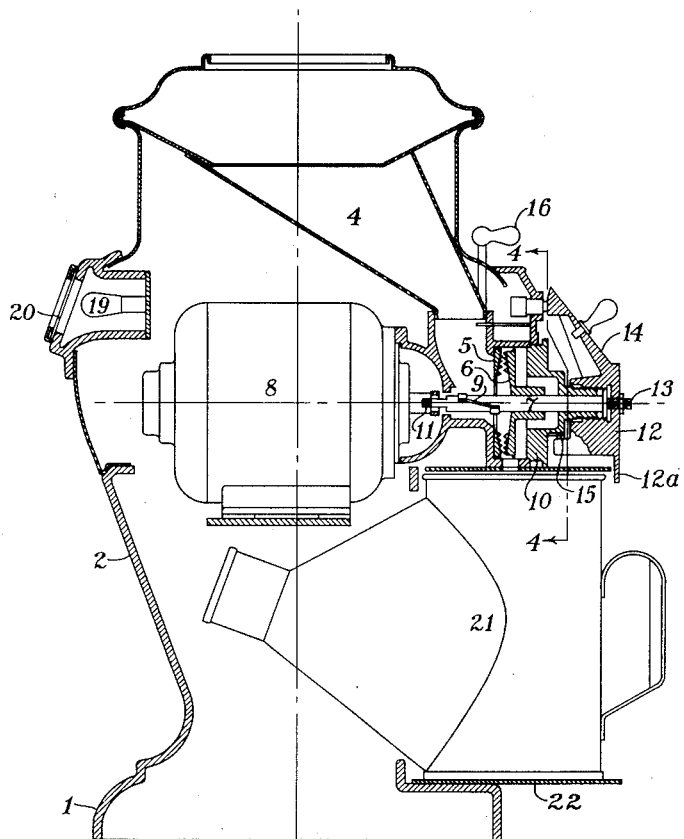
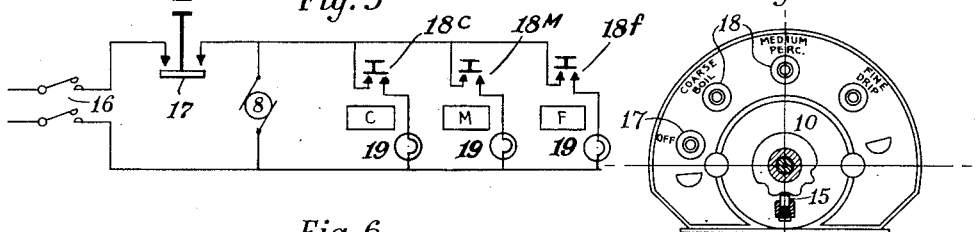
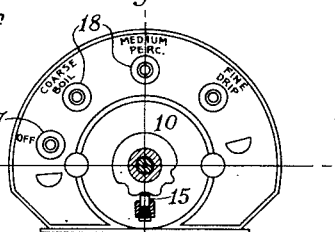
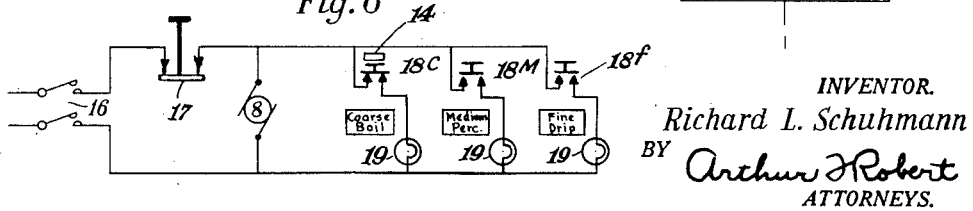
INVENTOR.
Richard L. Schuhmann
BY Arthur H Robert
ATTORNEYS.

Patented Jan. 16, 1940

2,187,102

UNITED STATES PATENT OFFICE 2,187,102

GRINDING MILL

Richard L. Schuhmann, Louisville, Ky., assignor to American Duplex Company, Louisville, Ky., a corporation of Kentucky Application October 31, 1936, Serial No. 108,538

5 Claims. (Cl. 83—18)

Coffee mills, having grinding elements that are manually adjustable to at least three different grinding positions corresponding to coarse, medium and fine grinds, are largely used in retail stores and operated by clerks who are supposed, first, to determine what kind of grind the customer requires and, second, to set the mill for such grind. In many instances, however, the clerks carelessly operate the mill on such previous setting as it may then have, and, as a result, often produce grinds which are not suited to the customer's requirements. To compel more individual attention on the part of the clerks and thereby correspondingly reduce the possibility of such careless operation, it has been proposed to provide such mills with means which necessitate the resetting of the grinding elements for each separate grinding operation and which indicate to the customer, the position at which the grinding elements are set during each grinding operation. The present invention is principally directed to an improvement in such means.

The principal object of the invention is to provide a simple and effective means for preventing the removal of ground coffee from the mill before it is reset to an inoperative position.

Another object is to provide a simple and effective system for stopping the motor when the mill is set to an inoperative position, for starting the motor when the mill is moved out of its inoperative position, and for indicating to customers the operative setting to which it may be moved, and to control the operation of such system automatically through the necessary movement of the setting means.

The invention is illustrated in the accompanying drawings wherein:

Figure 1 is a side elevation of a mill which embodies the invention and which is set in a nongrinding position;

Figure 2 is an elevation of the opposite side thereof;

Figure 3 is a section through line 3—3 of Figure 1 with the lid omitted and with the mill set in a grinding position;

Figure 4 is a section through line 4—4 of Figure 3; and

Figures 5 and 6 are diagrammatic views of the control system.

The invention, as illustrated, is applied to a coffee mill which is shaped externally to simulate the appearance of a well known form of coffee percolator. The casing comprises a base 1, body 2 and lid 3. The lid 3 covers an opening through which coffee beans may be introduced into a hopper 4. The beans pass downwardly from the hopper 4 to the inner or rear face of an inner grinder element 5 and thence through an opening in the element 5 into the grinding space between it and the outer grinder element 6. The inner grinder element 5 is fixedly mounted on a suitable frame within the body 2 of the casing while the outer grinder element 6 is fixedly mounted on a rotatable shaft 7 which is arranged for longitudinal movement between inner and outer limits.

The shaft 7 extends from the outer element 6 inwardly through the central opening of the inner element 5 with its inner end connected to the drive shaft of a motor 8 so as to be rotated thereby, this connection being slidable to permit longitudinal movement of the shaft. The latter carries, directly behind the inner element 5, a pair of oppositely disposed short blades 9 which operate, during rotation, to move the beans through the opening of the grinder element 5 into the grinding space. The shaft 7 also extends from the outer grinder element 6 outwardly through a cover member 10 and projects outwardly from the hub thereof. The cover member 10 is removably secured to the casing in any suitable manner and, when removed, permits the shaft 7 and grinder element 6 to be inserted into or removed from the casing as a unit.

In the embodiment illustrated the shaft 7 normally occupies a position adjacent the outer limit of movement which position is herein designated as "off". In moving from the "off" position toward the inner limit, the shaft 7 successively occupies, at spaced points, coarse, medium and fine grinding positions which are herein designated as "coarse boil", "medium perc" and "fine drip". The shaft 7 is normally urged longitudinally outward toward and held in the "off" position by a spring 11 arranged between it and the drive shaft of motor 8. Its longitudinal inward movement to any of its other positions, may be effected in any suitable manner. As shown, it is effected through the agency of a knob 12 which is placed over the projecting outer end of shaft 7 and screw-threaded to the outer peripheral face of the hub of cover member 10 so as to move inwardly and outwardly along the hub when angularly turned to the right and left (see Figure 1). The knob 12 carries an adjusting screw 13 which engages the end face of the shaft 7 in the "off" position of both shaft and knob. Manifestly when the knob is turned from the "off" to any other setting it will move inwardly and thus effect a corresponding inward movement of the grinder element 6. When returned to the "off" setting, the grinder element 6 will be returned under the influence of spring 11 acting on shaft 7.

The casing contains a stationary dial of the various settings of the mill while the knob carries a pointer 14 in position to move over the dial so that any setting may be quickly and accurately obtained simply by moving the pointer 14 along the dial to the point desired. The knob may be firmly but removably retained in each of its set positions by providing it with a spring pressed button 15 to engage in suitable hub depressions which correspond in number and spacing to the mill settings.

The operation of the mill, may of course, be controlled solely through a manually operable main line switch 16 in the motor circuit. With the present arrangement, however, it is desirable to stop the motor automatically when the mill is set at the "off" position. Accordingly a conventional automatically-closing push button control switch 17 is provided in the motor circuit and mounted on the casing in position to be depressed and held in its open position by the pointer 14 when the latter is in its "off" position and to close automatically and remain closed when the pointer is moved out of the "off" position. With a control switch of this character in the motor circuit, operation of the motor will begin automatically when the pointer is moved out of the "off" position and stop automatically when it is returned thereto.

When the pointer 14 is moved from the "off" to a grinding or operative setting, it is desirable to indicate, to a customer, the particular setting to which it has been moved. To this end an indicator system is provided having, for each operative setting, an automatically opening push button switch 18c, 18m or 18f and a lamp 19 to illuminate a window 20 which is visible to the customer and on or adjacent which the applicable setting data is printed or otherwise indicated. Each switch 18c, 18m or 18f is mounted on the casing and operated by pointer 14 in a manner similar to motor control switch 17. Thus the switch 18c, for the coarse boil setting, for example, is automatically closed by the pointer when it reaches the coarse boil position and automatically opened when it leaves such position. When closed, the switch closes the circuit of lamp 19, which is mounted behind the coarse boil window 20, the circuit for each such lamp being across the motor 8. Naturally the other switches 18m and 18f operate in a similar manner to energize their respective lamps 19 and thus effect the illumination of their respective indicator windows.

It may now be noted that ground coffee, discharged from the grinding space, passes downwardly into a removable coffee receiving receptacle 21 which is positioned underneath the grinding elements. This receptacle, in such coffee receiving position, projects partly into the interior of the casing through a side opening in the body thereof between base 1 and cover member 10 and rests in such position on a shelf 22.

Now, in further accordance with the invention, means are provided to prevent the removal of ground coffee from the mill before it is returned to the "off" position so as to compel its being reset before another grinding operation can be carried out. While this may be accomplished in various ways, it is herein accomplished in a simple and yet effective way by providing the knob 12 with an extension 12a, which in the "off" position extends out of the path of movement of the receptacle to and from coffee receiving position and which in all other positions of the pointer extends into such path sufficiently to block the removal or replacement of the receptacle 21. With this arrangement it is necessary to set the mill in the "off" position before the coffee receptacle can be removed or replaced; hence resetting is rendered necessary between separate grinding operations.

Having described my invention, I claim:

1. A grinding mill comprising cooperating and relatively adjustable grinding elements operable through a range of grinding positions, a control member adapted to be shifted by the operator for adjusting the relation of the grinding elements, and a receptacle located below and in a position to directly receive ground material from the grinding elements, means for supporting the receptacle in said position, and means on the control member and dependent upon adjustment of said member for locking the receptacle against removal in any position of grinding adjustment.

2. In a grinding mill having cooperating and relatively adjustable grinding elements operable through a range of grinding positions, a manually operable control member adapted to be moved by the operator for adjusting the position of the grinding elements and for designating the particular grind desired, a receptacle located below the grinding elements in a position to directly receive the ground material from the grinding elements, and means dependent upon the adjustment of the control member for locking the receptacle against removal in all positions of grinding adjustment.

3. In a grinding mill having grinding elements adjustable through a range of grinding positions, a manual control member for adjusting the position of the grinding elements, a receptacle for receiving the ground material, means for supporting the receptacle in a position for receiving the ground material, and means on said control member and dependent upon adjustment of said member for locking the receptacle against removal except when the control member is moved to a non-grinding position.

4. In a grinding mill having grinding elements adjustable through a range of grinding positions, a control member for adjusting the position of the grinding elements, a receptacle for receiving the ground material and means for supporting the receptacle in a position to receive said ground material, said control member having a projecting portion adapted to lock the receptacle against removal when in said position and in any position of grinding adjustment of the control member.

5. A grinding mill comprising cooperating grinding elements, a motor adapted when energized to operate said elements, a switch for energizing the motor, a control member adapted to adjust the grinding elements through a plurality of grinding positions and to actuate the switch whereby to open it and deenergize the motor when the control member is moved to a non-grinding position, and to close the switch and energize the motor when the control member is moved to any grinding position, a receptacle for receiving the ground coffee, and locking means dependent upon adjustment of the control member for retaining the receptacle in all positions of grinding adjustment.

RICHARD L. SCHUHMANN.